(12) United States Patent  
Greenfield et al.

(10) Patent No.: US 6,368,539 B1
(45) Date of Patent: Apr. 9, 2002

(54) METHODS OF EMBOSSING MATERIALS

(75) Inventors: Steven H. Greenfield, Duluth, MN (US); Carl Ingalls, Wallingford, PA (US)

(73) Assignee: Potlatch Corporation, Spokane, WA (US)

( * ) Notice: Subject to any disclaimer, the term of this patent is extended or adjusted under 35 U.S.C. 154(b) by 0 days.

(21) Appl. No.: 09/364,337

(22) Filed: Jul. 30, 1999

(51) Int. Cl.[7] .......................... B29C 59/04; B30B 11/18; B31B 1/07

(52) U.S. Cl. ...................... 264/284; 264/293; 425/365; 425/367; 425/374; 425/385; 425/505; 493/58; 493/396; 493/403

(58) Field of Search ............................... 425/367, 505, 425/336, 365, 369, 374, 385; 264/280, 284, 293, 320; 493/58, 60, 396, 475, 478, 479, 403

(56) References Cited

U.S. PATENT DOCUMENTS

| | | | | |
|---|---|---|---|---|
| 2,696,638 A | * | 12/1954 | Bower | 425/183 |
| 2,854,336 A | * | 9/1958 | Gutknecht | 430/323 |
| 2,890,540 A | * | 6/1959 | Britt | 264/284 |
| 3,708,366 A | * | 1/1973 | Donnelly | 156/209 |
| 4,000,242 A | * | 12/1976 | Hartbauer | 264/284 |
| 4,284,465 A | * | 8/1981 | Walbrun | 156/513 |
| 4,307,141 A | | 12/1981 | Walbrun | 428/132 |
| 4,320,162 A | | 3/1982 | Schulz | 428/154 |
| 4,483,728 A | | 11/1984 | Bauernfiend | 156/209 |
| 4,671,983 A | | 6/1987 | Burt | 428/179 |
| 4,759,967 A | | 7/1988 | Bauernfiend | 428/154 |
| 4,803,032 A | | 2/1989 | Schulz | 264/284 |
| 5,198,242 A | * | 3/1993 | Groeblacher et al. | 425/150 |
| 5,312,570 A | * | 5/1994 | Halter | 264/1.5 |
| 5,383,778 A | * | 1/1995 | Schulz | 425/363 |
| 5,597,639 A | | 1/1997 | Schulz | 428/156 |
| D382,713 S | | 8/1997 | Giesler, Sr. | D5/53 |
| D386,620 S | | 11/1997 | Giesler | D5/53 |
| D392,108 S | | 3/1998 | Diggins et al. | D5/57 |
| 5,846,636 A | * | 12/1998 | Ruppel et al. | 428/154 |
| D419,307 S | | 1/2000 | Boyce | D5/53 |
| 6,245,273 B1 | * | 6/2001 | Wendler, Jr. | 264/249 |

* cited by examiner

Primary Examiner—Jan H. Silbaugh
Assistant Examiner—Michael I. Poe
(74) Attorney, Agent, or Firm—Wells, St. John, Roberts, Gregory, & Matkin, P.S.

(57) ABSTRACT

A method of utilizing a single engraved embossing roll to emboss different expanses of material with different patterns. The single engraved embossing roll has at least two projections projecting therefrom. A first of the projections projects to a greater height from the roll than a second of the projections. In another aspect, the invention encompasses an apparatus for embossing different expanses of material with different patterns. The apparatus includes an engraved surface having at least two projections projecting therefrom. A first of the projections projects to a greater height than a second of the projections. The apparatus also includes a backing surface configured to receive the projections of the engraved surface. The backing surface and engraved surface are together configured to receive an expanse of material between them. The apparatus further includes a displacement mechanism configured to move at least one of the engraved surface and the backing surface relative to the other of the engraved surface and the backing surface.

25 Claims, 5 Drawing Sheets

METHODS OF EMBOSSING MATERIALS

TECHNICAL FIELD

The invention pertains to methods and apparatuses utilized for embossing materials. In particular aspects, the invention pertains to methods and apparatuses utilized for embossing non-woven materials and paper.

BACKGROUND OF THE INVENTION

Materials can be embossed for one or both of aesthetic and non-aesthetic purposes. For instance, paper webs are frequently embossed during formation of paper products to increase water-holding capacity of the paper products. The same embossing utilized to increase water-holding capacity can also provide a design on the paper product that is aesthetically pleasing to consumers and, in some instances, readily recognized by consumers for product identification and discrimination purposes. In particular aspects, embossing can occur after several plies of a multi-ply paper product are layered atop one another. In such aspects, the embossing can form a pattern of bosses which penetrate the multiple individual plies and holds them together in a final sheet.

Embossing has become a preferred and common practice in many industries. For instance, paper manufactures apply embossing patterns to many of the tissue and towel products currently produced. The patterns will vary from product to product across the manufacture's product lines, and accordingly each manufacturer will generally have supplies available to produce numerous different embossing patterns. An exemplary application of different embossing patterns is to distinguish premium product lines from non-premium lines. Specifically, the premium products will sometimes have a more complicated embossing pattern than the non-premium products.

Embossing patterns are typically formed with a so-called embossing roll, which is typically a cylinder having an engraved surface. A pattern of projections extend from the engraved surface and are pressed into a paper web to form a boss pattern within the web that is complimentary to the projections extending from the engraved embossing roll.

Engraved embossing rolls are typically expensive to fabricate, and somewhat difficult to replace in a paper-making process. However, as discussed above, paper manufacturers typically have several lines of product, each carrying its own specific boss pattern. Accordingly, the paper manufacturers will have on stock an assortment of engraved embossing rolls, with the individual rolls corresponding to individual distinct patterns of the paper manufacturer's line of products. The paper manufacturer will then substitute different rolls into a paper-making assembly process when shifting from one line of products to another, or will utilize different dedicated lines. In particular examples, the paper manufacturers will utilize engraved embossing rolls with relatively simple patterns of bosses when making a particular line of product, and will then substitute engraved embossing rolls with more elaborate patterns of bosses when making another line of products. Each substitution carries with it significant expense, as an entire converting process must generally be stopped and restarted during the process of substituting one engraved embossing roll for another. It would, accordingly, be desirable to develop methodologies which can reduce the amount of engraved embossing roll substitutions. Also, as individual engraved embossing rolls are relatively expensive, it would be further desirable to develop methodologies which could reduce the total number of engraved embossing rolls utilized by paper manufacturers in producing their various lines of product.

In another aspect of the prior art, a plurality of embossed plies can be "married" together to form a multiply product. An apparatus 200 configured for accomplishing such marrying is described with reference to FIG. 1. Apparatus 200 comprises a pair of engraved embossing rolls (202 and 204), and a pair of rubber-covered backing rolls (206 and 208). Apparatus 200 further comprises a glue applicator roll 210 and a marrying roll 212. In operation, a first paper web 214 is fed between rolls 204 and 208 to emboss a first pattern into web 214, and a second paper web 216 is fed between rolls 202 and 206 to emboss a second pattern into web 216. The second pattern is configured to nest within the first pattern. Accordingly, the patterned web 216 is nested within the patterned web 214, and the two webs are pressed together by marrying roll 212. Glue applicator roll 210 is utilized to provide an adhesive on patterned web 216. Such adhesive is utilized to adhere patterned webs 214 and 216 together.

It could be desirable to incorporate methodologies referred to above for reducing the total number of engraved embossing rolls utilized by paper manufacturers in producing their various lines of product into processes which marry a plurality of plies together.

SUMMARY OF THE INVENTION

In one aspect, the invention encompasses a method of utilizing a single engraved embossing roll to emboss different expanses of material with different patterns. The single engraved embossing roll has at least two projections projecting therefrom. A first of the projections projects to a greater height from the roll than a second of the projections.

In another aspect, the invention encompasses method of embossing different expanses of material with different patterns. An engraved embossing roll is provided and a backing roll is provided. The engraved embossing roll has at least two projections projecting therefrom. A first of the projections projects to a greater height from the roll than a second of the projections. The two projections define two distinct patterns. A first of the two distinct patterns comprises both the first and second projections, and a second of the two distinct patterns does not comprise the second projection. A first expanse of material is provided between the engraved embossing roll and backing roll. The engraved embossing roll is pressed against the first expanse to emboss a complementary image of one of the first and second distinct patterns into the first expanse. The first expanse is removed from between the engraved embossing roll and the backing roll. A second expanse of material is provided between the engraved embossing roll and the backing roll. The engraved embossing roll is pressed against the second expanse at a second pressure to emboss an other of the first and second distinct patterns on the second expanse.

In yet another aspect, the invention encompasses an apparatus for embossing different expanses of material with different patterns. The apparatus includes an engraved surface having at least two projections projecting therefrom. A first of the projections projects to a greater height than a second of the projections. The apparatus also includes a backing surface configured to receive the projections of the engraved surface. The backing surface and engraved surface are together configured to receive an expanse of material between them. The apparatus further includes a displacement mechanism configured to move at least one of the engraved surface and the backing surface relative to the other of the engraved surface and the backing surface.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The invention encompasses methods of utilizing a single engraved embossing roll to form at least two different embossing patterns. In particular aspects, the invention encompasses methods of utilizing a single engraved embossing roll to form relatively complex patterns on some materials, and relatively simple patterns on other materials. The invention can be utilized in, for example, applications in which manufacturers of embossed materials (such as, for example, non-woven materials or sheets of paper) produce both premium and non-premium lines of material, with the lines differing from one another in a complexity of an embossed pattern. The invention enables such manufacturers to utilize only a single engraved embossing roll to form at least two different product lines of embossed patterns. Such can enable the manufacturers to save expense by both reducing the total number of different engraved embossing rolls that the manufacturers require, and by reducing downtime associated with changing engraved embossing rolls in prior art manufacturing processes.

Figure 2:
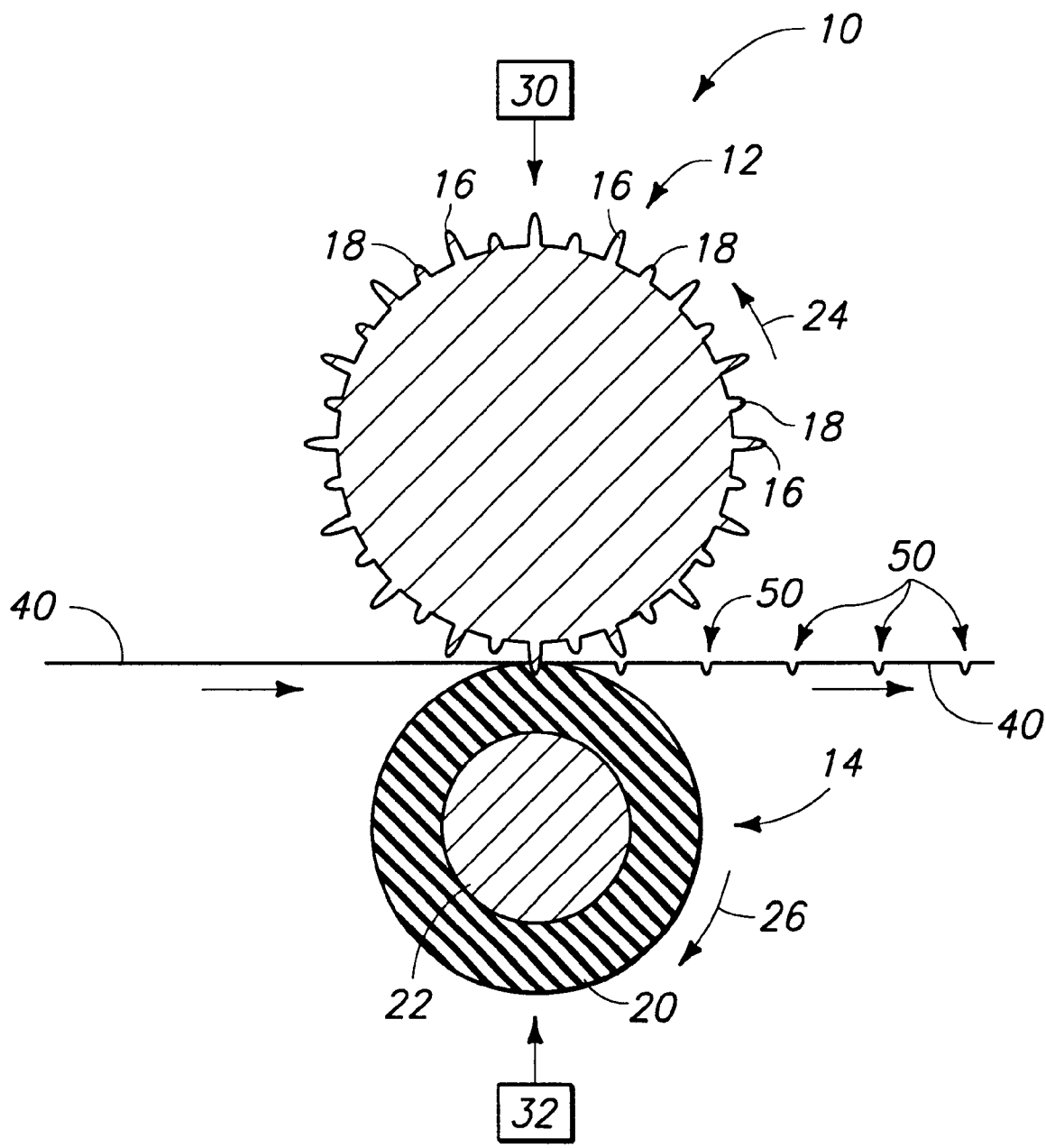
FIG. 2 is a cross-sectional, diagrammatic, fragmentary view of a paper making device utilized according to a method of the present invention.

An exemplary method of the present invention is described with reference to FIGS. 2–5. Referring first to FIG. 2, such illustrates an embossing apparatus 10 encompassed by the present invention. Apparatus 10 comprises an engraved embossing roll 12 and a backing roll 14. Engraved embossing roll 12 comprises a number of first projections 16 projecting outwardly from engraved embossing roll 12 to a first height, and a plurality of second projections 18 projecting outwardly from roll 12 to a second height which is less than the first height. A difference in height between the first and second projections is preferably from about 0.005 inches to about 0.030 inches, and more preferably from about 0.01 inches to about 0.02 inches. As will become apparent from the discussion below, first and second projections 16 and 18 together define a first distinct pattern which can be embossed into a material, and first projections 16 alone define a second distinct pattern which can be embossed into a material. In the embodiment of FIG. 2, it is the second distinct pattern which is embossed into a material.

Engraved embossing roll 12 is formed of a relatively hard material, such as, for example, steel, and projections 16 and 18 are engraved into such hard material. In contrast, backing roll 14 comprises a relatively deformable material 20, such as, for example, rubber. In exemplary embodiments, such rubber has a durometer hardness of from about 40 to about 80, and in preferred embodiments has a durometer hardness of about 45. The deformable material 20 is formed in a layer (typically from about ¼ inch to about ¾ inch thick) which is wrapped around a support 22. Support 22 can comprise a relatively hard material, such as, for example, steel.

Structures 12 and 14 are referred to as "rolls" to indicate a rolling motion of structures 12 and 14 (as indicated by directional arrows 24 and 26), and is not intended to indicate any particular shape of structures 12 and 14. In exemplary embodiments, structures 12 and 14 have cylindrical shapes, with a length of the respective cylinders of 12 and 14 extending into the plane of the paper of FIG. 2. In a particular preferred embodiment, rolls 12 and 14 comprise cylinders having diameters of from about 10 inches to about 25 inches. Although structures 12 and 14 are shown as cylinders, it is to be understood that other shapes can be utilized for structures 12 and 14.

Rolls 12 and 14 are coupled with displacement mechanisms 30 and 32, respectively. Displacement mechanisms 30 and 32 press rolls 12 and 14 toward one another, or move rolls 12 and 14 away from one another. When rolls 12 and 14 are pressed toward one another, the deformable material 20 of roll 14 receives projections 16 of engraved embossing roll 12. It is noted that although the shown embodiment comprises displacing mechanisms for moving both of rolls 12 and 14 toward one another, the invention encompasses other embodiments (not shown) wherein only one of rolls 12 and 14 is coupled with a displacing mechanism and wherein the other of the rolls is held stationary.

An expanse 40 of material is received between rolls 12 and 14. Expanse 40 can comprise, for example, a non-woven material or paper. In particular embodiments, expanse 40 can be a toilet tissue, facial tissue, or paper towel. Expanse 40 can comprise a single-ply or multiply material.

Projections 16 of roll 12 press into expanse 40 as the expanse passes between rolls 12 and 14. Projections 16 thereby form a pattern of deformations (which can be referred to as bosses) 50 within material 40 complementary to the above-described second distinct pattern corresponding to projections 16. Such pattern of deformations 50 can also be referred to as an embossing pattern. The shown circular cross-sections of rolls 12 and 14 have centers corresponding to the centers of diameters extending through the circular cross-sections. The distance between the centers of rolls 12 and 14 is controlled by displacement mechanisms 30 and 32 so that only highest-most projections 16 penetrate material 40 (i.e., so that lowest-most projections 18 do not penetrate material 40).

Figure 3:
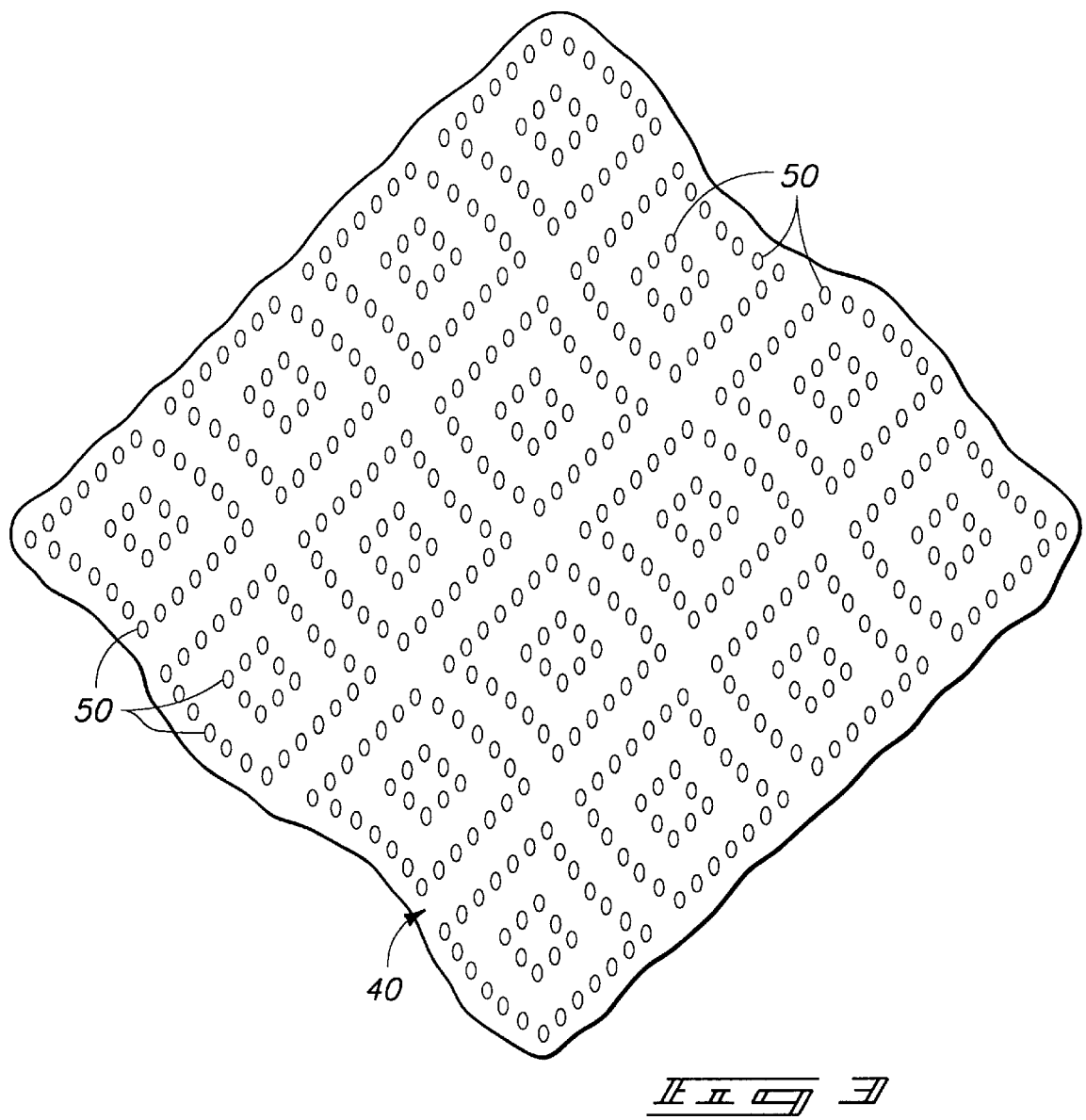
FIG. 3 is a fragmentary, top view of a material embossed with a pattern produced by the device of FIG. 2.

An exemplary pattern formed by the methodology of FIG. 2 is illustrated in FIG. 3. Specifically, FIG. 3 illustrates a fragment of expanse 40 having an embossing pattern defined by bosses 50 (only some of which are labeled). The plurality of bosses 50 define a set of bosses which penetrate within expanse 40 to a substantially uniform depth.

Figure 4:
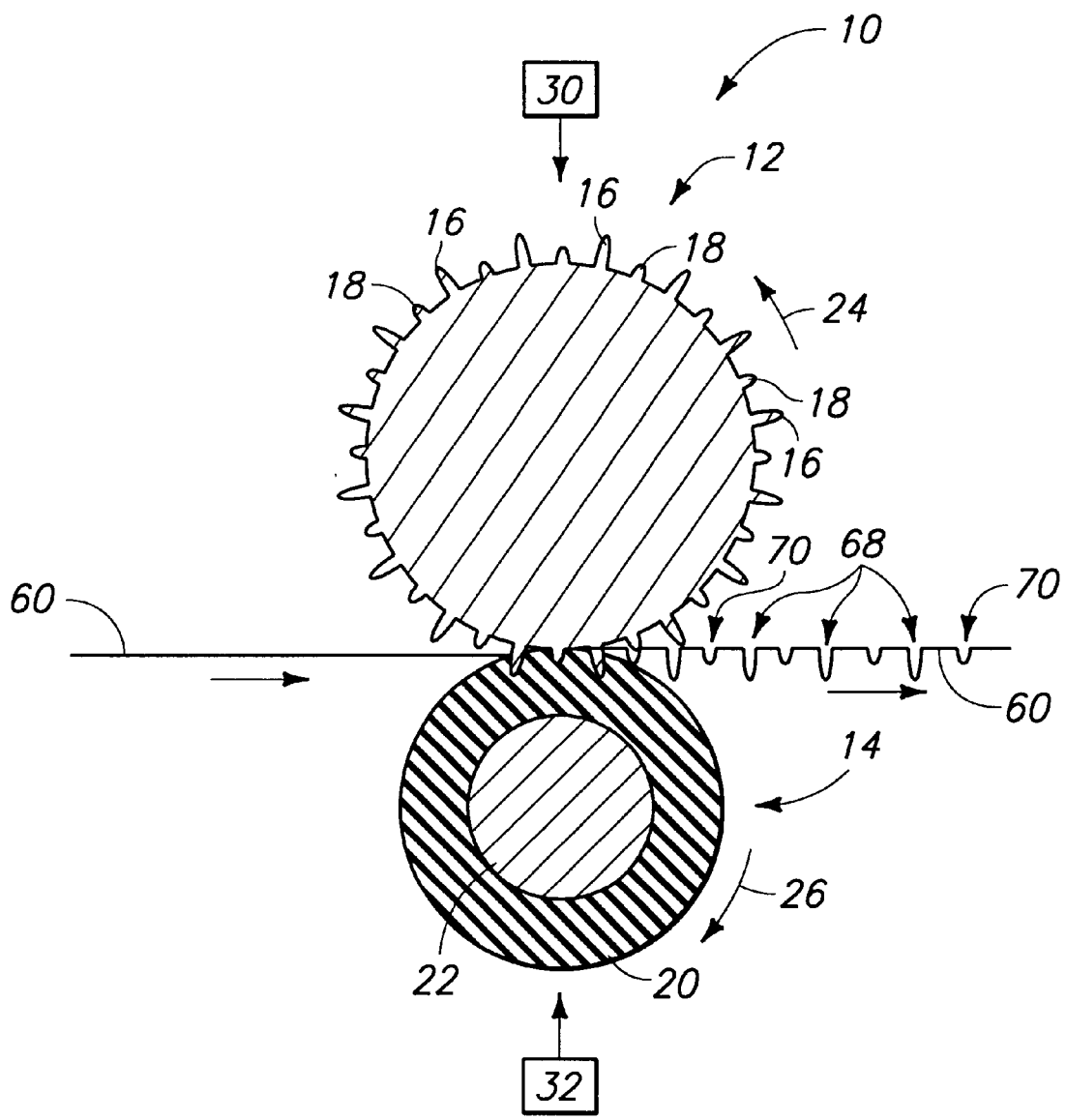
FIG. 4 is a cross-sectional view of the FIG. 2 device utilized under conditions different from those of FIG. 2 to produce a different embossing pattern from that shown in FIG. 3.

Expanse 40 has a relatively simple embossing pattern formed from engraved embossing roll 12. FIG. 4 illustrates engraved embossing roll 12 utilized for forming a more complex embossing pattern. Specifically, FIG. 4 illustrates an application wherein displacement mechanisms 30 and 32 are utilized to provide reduce a distance between the centers of rolls 12 and 14 relative to the distance of FIG. 2. Such reduction in distance cause both first and second projections (16 and 18) to be forced into backing roll 14.

An expanse 60 of material is provided between rolls 12 and 14. Expanse 60 is different from expanse 40 (FIG. 2), with the term "different" meaning that expanse 60 is either comprised by an entirely different material from expanse 40, or is at a separate location along a common and continuous material that also comprises expanse 40. Expanse 40 is removed from between rolls 12 and 14 before provision of expanse 60 between the rolls. If expanse 40 and expanse 60 are formed at different locations along a common and continuous material, such removal can be accomplished by advancing the material through rolls 12 and 14 to a location where formation of the embossing pattern of expanse 60 is to begin. The advancing of the material can, and preferably does, occur without breaking the material. It is desirable to avoid breaking the material as such can avoid down-time at a manufacturing plant.

The methodology of FIG. 4 forms a more complex embossing pattern in expanse 60 than was formed in expanse 40 of FIG. 2. More specifically, the embossing pattern formed in expanse 60 comprises a plurality of deep bosses 68 formed from the first projections 16, and a plurality of shallower bosses 70 formed from the second projections 18. Accordingly, expanse 60 has an embossing pattern corresponding to the above-described first distinct pattern defined by projections 16 and 18 (i.e., a distinct pattern comprising components defined by both first projections 16 and second projections 18).

Figure 5:
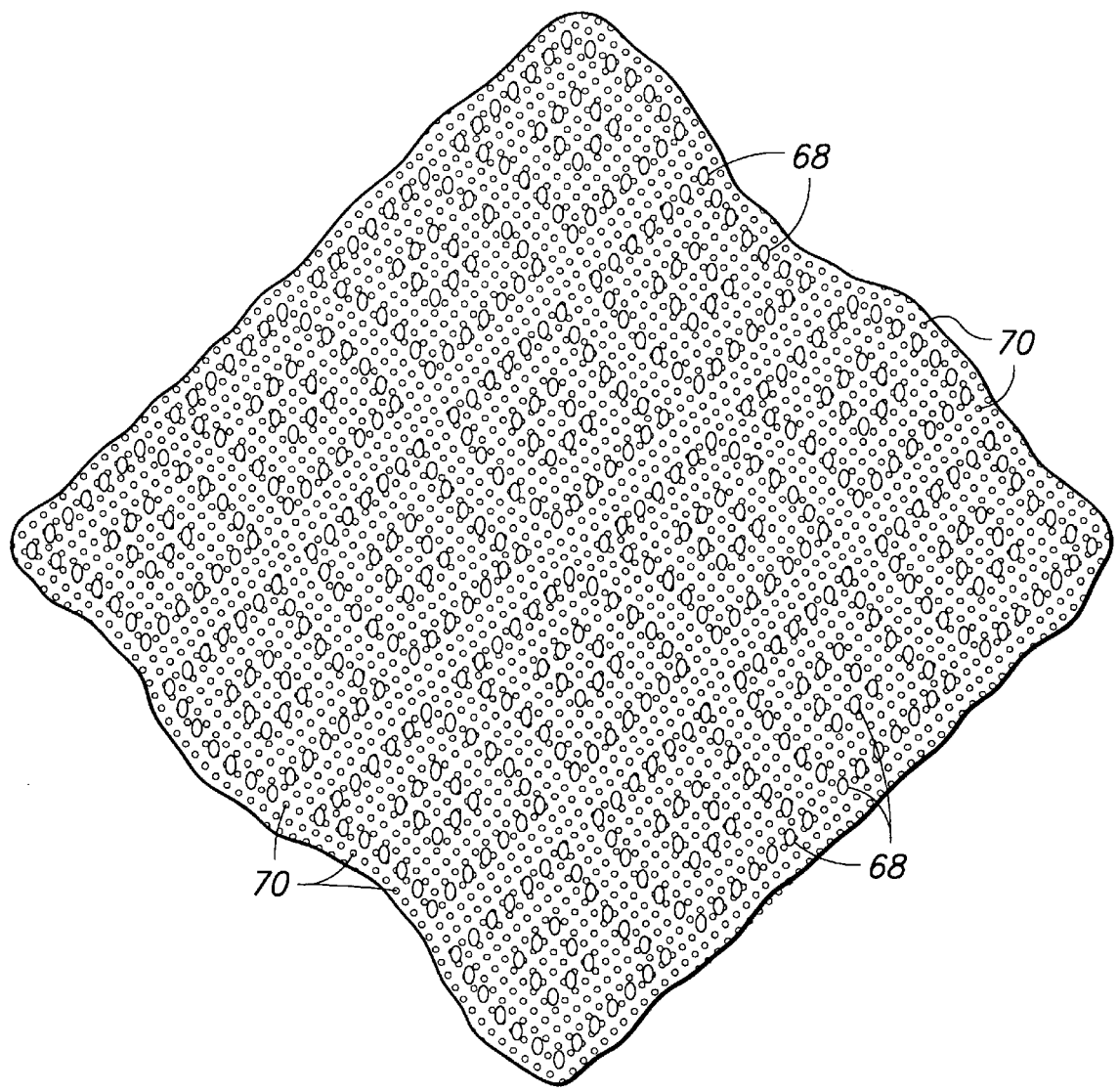
FIG. 5 is a fragmentary, top view of a material embossed with a pattern produced under the conditions of FIG. 4.

FIG. 5 illustrates an exemplary embossing pattern formed by the methodology of FIG. 4. Specifically, FIG. 5 illustrates expanse 60 having relatively deep bosses 68 (only some of which are labeled) and relatively shallow bosses 70 (only some of which are labeled). The bosses 68 of FIG. 5 form a pattern identical to the pattern of bosses 50 of FIG. 3, with a difference between bosses 68 and bosses 50 being that bosses 68 extend to a greater depth than do bosses 50.

Comparing FIGS. 3 and 5, FIG. 5 has a more complex embossing pattern formed thereover than does FIG. 3. In particular embodiments, expanses 40 and 60 of FIGS. 3 and 5 could comprise paper products, with the product of FIG. 3 corresponding to a non-premium brand and that of FIG. 5 corresponding to a premium brand. Accordingly, the exemplary methodology of the present invention described above utilizes a single engraved embossing roll 12 to form two different distinct patterns of bosses.

Exemplary pressures which can be utilized for forming the patterns of FIGS. 3 and 5 can be quantitated as a nip width of the rubber material 20 of backing roll 14. An exemplary application utilizes a rubber material 20 comprising a durometer hardness of about 45 and a thickness of from about ¼ inch to about ¾ inch. The exemplary application also utilizes first projections 16 that are from about 0.010 inches to about 0.02 inches higher than second projections 18.

Figure 1:
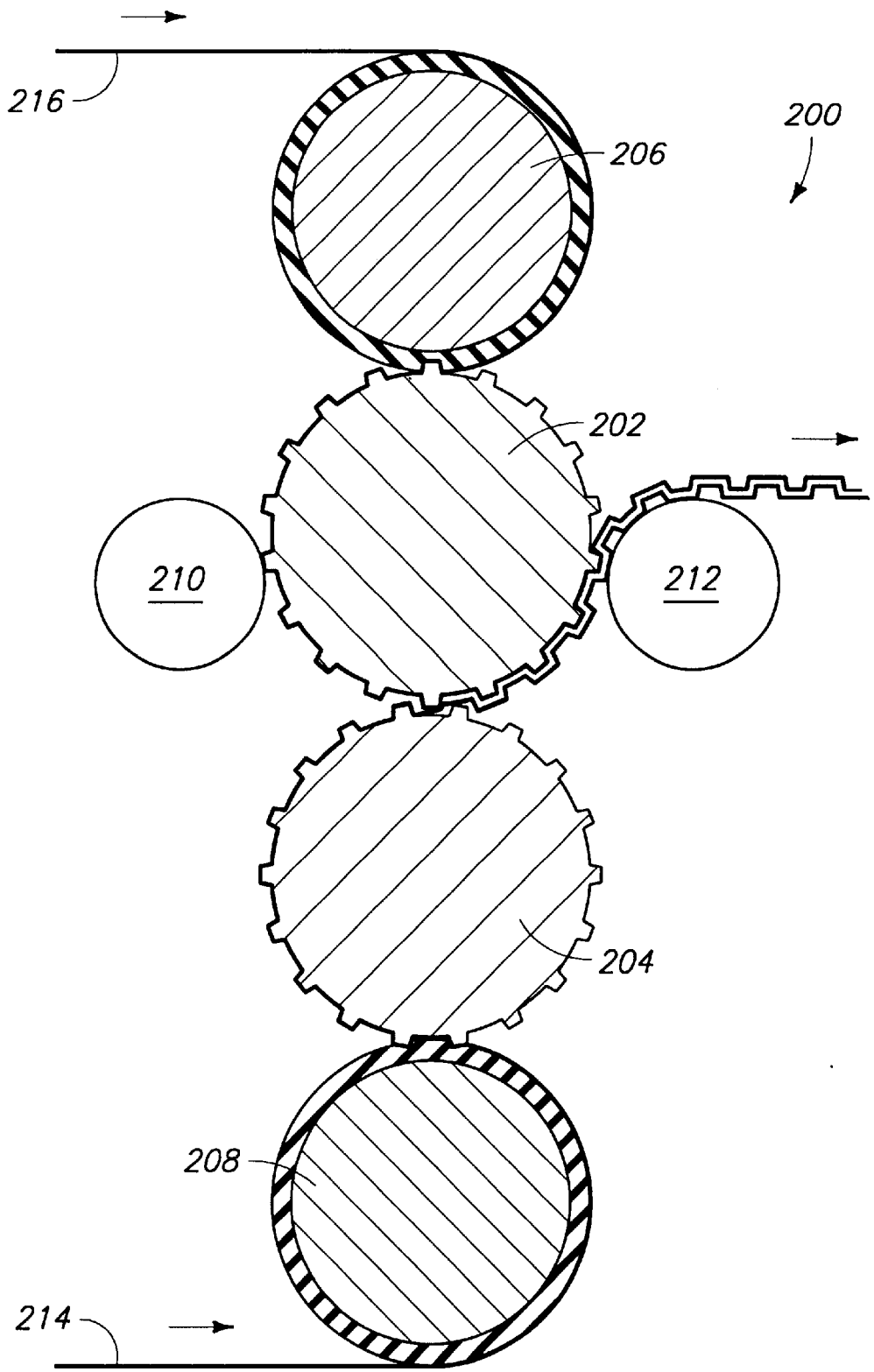
FIG. 1 is a cross-sectional, diagrammatic, fragmentary view of a prior art paper making device.

It is noted that the embossed expanses of the present invention can be further combined as individual expanses of multi-ply products. Such can be accomplished by, for example, incorporating the rolls described above with reference to FIGS. 2–5 into a marrying apparatus, such as, for example, the apparatus 200 described above with reference to FIG. 1.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method comprising utilizing a single engraved embossing roll to emboss different expanses of material with different patterns and to form at least two different product lines, a first of the different patterns being incorporated into a first product line, a second of the different patterns being incorporated into a second product line, the single engraved embossing roll having at least two projections projecting therefrom, and a first of the projections projecting to a greater height from the roll than a second of the projections.

2. The method of claim 1 wherein the difference in height of the first and second projections is from about 0.005 inches to about 0.03 inches.

3. The method of claim 1 wherein the difference in height of the first and second projections is from about 0.01 inches to about 0.02 inches.

4. The method of claim 1 wherein the different expanses comprise different materials.

5. The method of claim 1 wherein the different expanses comprise a common material.

6. The method of claim 1 wherein the different expanses are comprised by a common and continuous material.

7. The method of claim 1 wherein the different expanses comprise paper.

8. The method of claim 1 wherein the different expanses comprise one or more non-woven materials.

9. The method of claim 1 wherein the embossing one of the different patterns comprises embossing with only the first of the projections and the embossing another of the different patterns comprises embossing with the at least two projections.

10. A method of embossing different expanses of material with different patterns, comprising:

pressing the different expanses sequentially between a single engraved embossing roll and a backing roll, the engraved embossing roll having at least two projections projecting therefrom, a first of the projections projecting to a greater height from the roll than a second of the projections, the projections comprising a first material and the backing roll comprising a second material, the first material less deformable than the second material;

wherein the pressing of one of the different expanses between the embossing and backing rolls is configured to force only one of the first and second projections into said one of the expanses; and wherein the pressing of an other of the different expanses between the embossing and backing rolls is configured to force both of the first and second projections into said other of the expanses.

11. The method of claim 10 wherein the different expanses are comprised by a common and continuous non-woven material.

12. The method of claim 10 wherein the different expanses are comprised by a common and continuous paper web.

13. A method of embossing different expanses of material with different patterns, comprising:

providing an engraved embossing roll and a backing roll, the engraved embossing roll having at least two projections projecting therefrom, a first of the projections projecting to a greater height from the roll than a second of the projections, the two projections defining two distinct patterns, a first of the two distinct patterns comprising both the first and second projections and a second of the two distinct patterns not comprising the second projection;

providing a first expanse of material between the engraved embossing roll and backing roll;

pressing the engraved embossing roll against the first expanse to emboss a complementary image of one of the first and second distinct patterns into the first expanse;

removing the first expanse from between the engraved embossing roll and the backing roll;

providing a second expanse of material between the engraved embossing roll and the backing roll; and pressing the engraved embossing roll against the second expanse to emboss an other of the first and second distinct patterns on the second expanse.

14. The method of claim 13 wherein the first pressing forms the complementary pattern of the first distinct pattern.

15. The method of claim 13 wherein the different expanses are comprised by a common and continuous material, and wherein the removing comprises advancing the material through the embossing and backing rolls without breaking the material.

16. The method of claim 13 wherein the first pressing forms the complementary pattern of the second distinct pattern.

17. The method of claim 13 wherein at least one of the first and second expanses comprises a non-woven material.

18. The method of claim 13 wherein both of the first and second expanses comprise a non-woven material.

19. The method of claim 13 wherein at least one of the first and second expanses comprises a paper web.

20. A method of embossing different expanses of material with different patterns, comprising:

providing an engraved embossing roll and a backing roll, the engraved embossing roll having a plurality of projections projecting therefrom, the projections comprising at least two sets, a first of the at least two sets of projections projecting to a first height from the engraved embossing roll and a second set of the at least two sets of projections projecting to a second height less than said first height, the two sets of projections defining two distinct patterns, a first of the two distinct patterns comprising both the first and second sets of projections and a second of the two distinct patterns comprising only the first set of projections;

providing a first expanse of material between the engraved embossing roll and backing roll;

first pressing the engraved embossing roll against the first expanse to emboss a complementary image of one of the first and second distinct patterns into the first expanse;

removing the first expanse from between the engraved embossing roll and the backing roll;

providing a second expanse of material between the engraved embossing roll and the backing roll; and second pressing the engraved embossing roll against the second expanse to emboss an other of the first and second distinct patterns on the second expanse.

21. The method of claim 20 wherein the first pressing forms the complementary pattern of the first distinct pattern.

22. The method of claim 20 wherein the first pressing forms the complementary pattern of the second distinct pattern.

23. The method of claim 20 wherein at least one of the first and second expanses comprises a non-woven material.

24. The method of claim 20 wherein both of the first and second expanses comprise a non-woven material.

25. The method of claim 20 wherein at least one of the first and second expanses comprises a paper web.

* * * * *